(12) United States Patent
Walters et al.

(10) Patent No.: US 11,030,272 B1
(45) Date of Patent: *Jun. 8, 2021

(54) SYSTEM FOR AUTOMATING THE CREATION AND EVALUATION OF WEBSITE VARIATIONS TO IMPROVE USER ENGAGEMENT

(71) Applicant: Capital One Services, LLC, McLean, VA (US)

(72) Inventors: Austin Walters, Savoy, IL (US);
Jeremy Goodsitt, Champaign, IL (US);
Ahn Truong, Champaign, IL (US);
Reza Farivar, Champaign, IL (US);
Mark Watson, Philadelphia, PA (US);
Fardin Abdi Taghi Abad, Champaign, IL (US)

(73) Assignee: Capital One Services, LLC, McLean, VA (US)

(*) Notice: Subject to any disclaimer, the term of this patent is extended or adjusted under 35 U.S.C. 154(b) by 58 days.

This patent is subject to a terminal disclaimer.

(21) Appl. No.: 16/571,346

(22) Filed: Sep. 16, 2019

Related U.S. Application Data (63) Continuation of application No. 16/239,406, filed on Jan. 3, 2019, now Pat. No. 10,503,804.

(51) Int. Cl.
| | | |
|---|---|---|
| *G06F 3/00* | (2006.01) | |
| *G06F 16/957* | (2019.01) | |
| *G06F 16/958* | (2019.01) | |
| *G06F 8/38* | (2018.01) | |
| *G06N 3/12* | (2006.01) | |
| *G06F 8/20* | (2018.01) | |

(52) U.S. Cl.
CPC .......... *G06F 16/9577* (2019.01); *G06F 8/22* (2013.01); *G06F 8/38* (2013.01); *G06F 16/958* (2019.01); *G06N 3/126* (2013.01)

(58) Field of Classification Search
None
See application file for complete search history.

(56) References Cited

U.S. PATENT DOCUMENTS

| | | |
|---|---|---|
| 8,818,846 B2 | 8/2014 | Robbins et al. |
| 9,479,562 B2 | 10/2016 | Funge et al. |
| 2008/0172629 A1 | 7/2008 | Tien et al. |
| 2010/0268661 A1 | 10/2010 | Levy et al. |
| 2012/0311126 A1 | 12/2012 | Jadallah et al. |
| 2016/0224999 A1 | 8/2016 | Mukherjee et al. |

OTHER PUBLICATIONS

European Search Report from European Patent Application No. 20150213.5 dated Feb. 27, 2020.

(Continued)

*Primary Examiner* — Maikhanh Nguyen
(74) *Attorney, Agent, or Firm* — Greenberg Traurig, LLP (57) ABSTRACT

Described is a system (and method) for automating the process of generating variations of a website that may be continually evaluated to improve a user interaction flow. The process may be based on a genetic algorithm that creates improving generations of websites. For example, the system may automate the creation of different layouts for a website and evaluate the effectiveness of each layout based on a particular user interaction goal. The most effective (e.g., top performing) layouts may be determined and then "bred" as part of an iterative improvement process.

20 Claims, 6 Drawing Sheets

(56) References Cited

OTHER PUBLICATIONS

Bakaev et al., "Application of Evolutionary Algorithms in Interaction Design"; Requirements and Ontology to Optimized Web Interface, pp. 129-134, 2016.

Bakaev et al., "Current Trends in Automating Usability Evaluations of Websites: Can You Manage What You Can't Measure?", Humanitarian and Economical Aspects of Engineering Sciences, pp. 510-514, 2016.

Tamburrelli et al., "Towards Automated A/B Testing", SSBSE 2014, pp. 184-198.

Ros et al., "Automated Controlled Experimentation on Software by Evolutionary Bandit Optimization", SSBSE 2017, pp. 190-196.

Unknown author, webpage "Optimizely X Full Stack" <<https://www.optimizely.com/products/full-stack/>>; accessed Jan. 3, 2018; pp. 1-6.

Unknown author, webpage "Welcome" <<https://www.optimizely.com/full-stack/docs>>; access Jan. 3, 2018; pp. 1-2.

Unknown author, webpage "Review core concepts" <<https://docs.developers.optimizely.com/full-stack/docs/uderstand-core-concepts>>; accessed Jan. 3, 2018; pp. 1-2.

Unknown author, webpage "Run A/B tests" <<https://docs.developers.optimizely.com/full-stack/docs/ab-tests>>; accessed Jan. 3, 2018; pp. 1-2.

SYSTEM FOR AUTOMATING THE CREATION AND EVALUATION OF WEBSITE VARIATIONS TO IMPROVE USER ENGAGEMENT

CROSS-REFERENCE TO RELATED APPLICATIONS

This application is a continuation of U.S. patent application Ser. No. 16/239,406, filed on Jan. 3, 2019 and issued as U.S. Pat. No. 10,503,804 on Dec. 10, 2019, the entirety of which is incorporated herein by reference.

TECHNICAL FIELD

This disclosure relates to a system that automatically creates variations of a website, and more particularly, creates variations of a website using a genetic algorithm to improve user engagement.

BACKGROUND

When developing websites, user interaction testing is often performed to evaluate the effectiveness of a particular website design. One testing technique includes A/B testing in which two versions of a website are compared. For example, two versions of a particular variable may be compared to determine which version of a variable performs better on a particular website. When performing such testing, developers often create an initial design and then alter particular design elements individually. Due to the nature of such testing, there exists software that aids in the process of performing A/B testing. For example, such software allows the developer to select particular design elements of a website to test. However, such software requires that the developer (or user) to predefine such elements. Accordingly, the developer must submit various design configurations in isolation and determine which design elements may potentially work in combination. Although such software may aid in the process of selecting various design elements, the potential combinations are limited to those conceived by the developer. Accordingly, there is a need to provide an efficient mechanism to expand the potential set of website variations beyond those explicitly conceived by a developer.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

Various implementations and aspects of the disclosures will be described with reference to details discussed below, and the accompanying drawings will illustrate the various implementations. The following description and drawings are illustrative of the disclosure and are not to be construed as limiting the disclosure. Numerous specific details are described to provide a thorough understanding of various implementations of the present disclosure. However, in certain instances, well-known or conventional details are not described in order to provide a concise discussion of implementations of the present disclosure.

Reference in the specification to "one implementation" or "an implementation" or "some implementations," means that a particular feature, structure, or characteristic described in conjunction with the implementation can be included in at least one implementation of the disclosure. The appearances of the phrase "implementation" in various places in the specification do not necessarily all refer to the same implementation.

In some implementations, described is a system (and method) for automating the process of generating variations of a web site that may be continually evaluated and improved to increase user engagement. For example, the system may automate the creation of different websites and evaluate the effectiveness of each website based on a set of performance metrics that may relate to various user interaction goals. Accordingly, features from the most effective (e.g., top performing or highest ranking) websites may then be selected (or propagated) for a new generation of websites as part of an interactive improvement process.

In some implementations, the variations of the websites may alter various website elements (or components, or features) associated with a layout of the website. For example, the variations of a layout may alter the values or properties, such as the color, alignment, size, placement, text, etc. for various elements of a website. To determine the effectiveness of such layouts, the system may evaluate various performance metrics describing or measuring user interactions with the website. For example, the performance metric may relate to user interactions such as whether a particular user action is performed (e.g., whether a user initiates a sign-up or a purchase) or an amount of time it takes for a user to perform a particular action (e.g., the amount of time for a user to initiate a sign-up or a purchase). In some implementations, effectiveness may be ascertained by comparing a measured performance metric to a corresponding goal or optimal value, such as "true" for binary metrics (e.g., whether a particular user action is performed), or a specific desired time period (e.g., 5 seconds, less than 7 seconds, or the shortest time compared to other websites) for user interaction time metrics (e.g., the amount of time for a user to perform an action). Based on such performance metrics, the system may identify elements from the most effective websites/layouts and propagate them to a subsequent set of websites (e.g., a new generation of websites) as part of an iterative process.

In some implementations, such an iterative process may be implemented using characteristics of a genetic algorithm. For example, the system may "breed" the most effective websites in a continuous process to refine the layout of a website. In general, a genetic algorithm includes a set of candidate solutions (or variables) that are evolved to provide more effective solutions. For example, each candidate solution may have a set of properties (e.g., chromosomes/genes) which can be varied. Accordingly, an iterative process is performed to create a new generation of a population, and the fitness of every individual in the population is evaluated and a selection (e.g., the most fit individuals) from the current population is performed. For each generation, each individual's chromosomes are modified (e.g., recombined/selected or randomly mutated) to form a new generation. Commonly, the algorithm may terminate when either a maximum number of generations has been produced, or a satisfactory fitness level has been reached for the population.

Accordingly, in one implementation, a layout of a website may be improved based on a process that simulates or implements a genetic algorithm. For example, using the genetic analogy as described above, elements (e.g., the values of design elements, components, or features) of a website layout may correspond to chromosomes/genes, and the performance metric may correspond to a fitness function. New generations of websites/layouts may be created (e.g. bred) using element values of the websites/layouts determined to be the most effective.

Accordingly, described is a system that may provide an automated approach to improving (or partially optimizing) the layout or design of a website. As further described herein, such a system may be provided within an operating environment.

Figure 1:
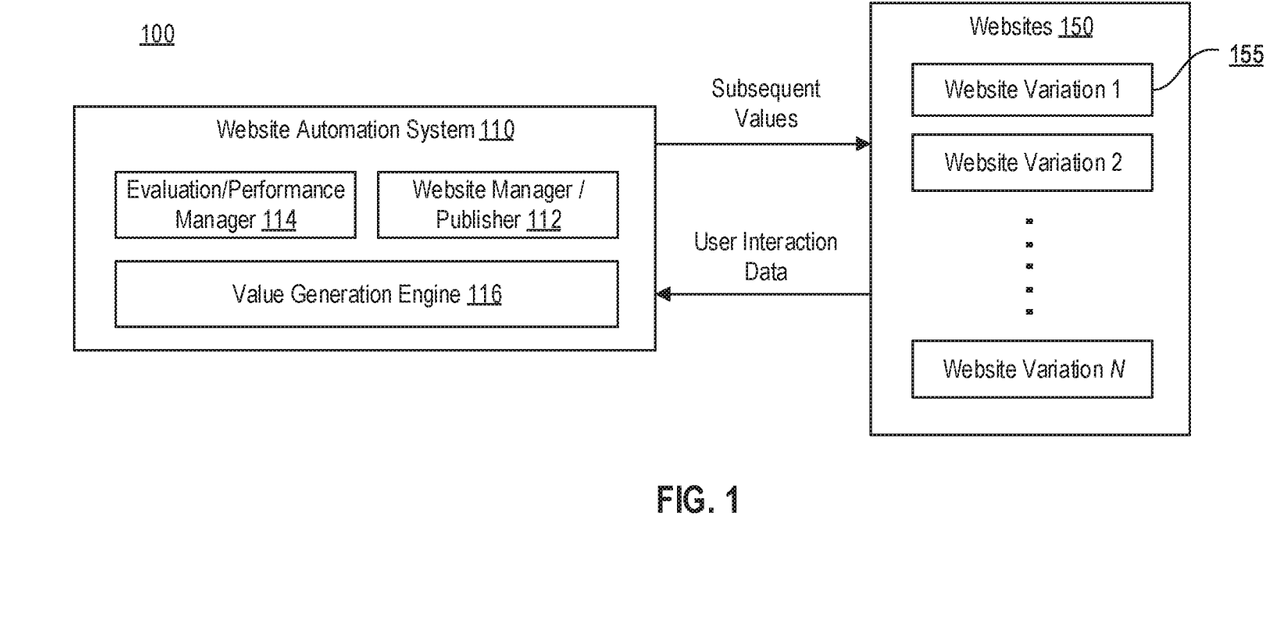
FIG. 1 is a block diagram illustrating an example of an operating environment for automating the creation of website variations according to one or more implementations of the disclosure.

FIG. 1 is a block diagram illustrating an example of an operating environment for automating the creation of website variations according to one or more implementations of the disclosure. As shown, the operating environment 100 may include a website automation system 110 and a set of websites 150, which may interact via a network (not shown). The network may be any type of wired or wireless network including a local area network (LAN), a wide area network (WAN), or a direct communication link, or other suitable connection.

The website automation system 110 may automate the process of creating variations of a website and determining the effectiveness of each website by measuring performance metrics that relate to user engagement. In one implementation, the website automation system 110 may implement a genetic algorithm that creates continually improving generations of websites. In one implementation, the website automation system 110 may include a website manager/publisher 112 (or website manager 112), an evaluation/performance manager 114 (or performance manager 114), and a value generation engine 116, as well as other components not shown.

The website manager 112 may perform operations to publish websites, for example, on the internet to be accessible by the public. In one implementation, the website manager 112 may publish an initial set of websites 150 as well as each new generation of websites 150 that may be generated from an iterative website variation process. In one implementation, the website manager 112 may publish the websites 150 to a subset of the public. For example, websites may be published based on demographic information, user account information, or any other criteria to potentially refine layouts for a particular subset of users. It should be noted that although the website manager 112 is shown as part of system 110, the website manager 112 may also be part of another system, such as a website hosting system. Accordingly, the website automation system 110 may initiate publication of websites 150 or initiate the update of websites 150 (e.g., by providing subsequent values) via instructions to the hosting system.

The performance manager 114 may monitor the performance of each web site variation and calculate or determine a performance metric(s). In one implementation, the performance manager 114 may receive, capture, or otherwise obtain user interaction data from the websites 150. For example, such interaction data may include an action or navigation history, a time to complete an action or task, and various other characteristics that may measure user engagements with and actions on a particular website. In addition, the performance manager 114 may determine the most effective (or top performing) websites based on the gathered interaction data, for example, by analyzing the user interaction data in comparison to predetermined interaction goals.

The value generation engine 116 may identify or determine a set of values that will be used to create subsequent generations of websites 150. For example, the value generation engine 116 may perform various processing steps including calculating or determining a performance weighting for an element, selecting the values from identified websites (e.g., top performers), and mutating one or more values of the subsequent values. Accordingly, the value generation engine 116 may be adapted to implement various components (e.g., machine learning, genetic algorithm components, etc.) to further refine an iterative website variation process as described herein.

As shown, the website automation system 110 may generate or provide a subsequent set of values that are used to create website variations. For example, the set of values may correspond to values for elements (or components, or features, or functionality) that describe or define a website. In one implementation, the elements may describe or define a layout of the website, such as Cascading Style Sheet (CSS) elements, and the values may correspond to values for the CSS elements that may be specified in the source code of a website. In addition, values for other types of elements within the source code (e.g., HTML elements) are also contemplated.

The websites 150 may be any type of website or page(s) with which the user interacts. The websites 150 may be hosted on one or more different host systems. In one implementation, the website variations may be hosted on various vendors associated with an entity providing the website (e.g., a financial institution). For example, variations of websites may be dispersed across multiple host systems associated with various vendors (or partners) associated with the entity providing the website, such as a financial entity. For instance, various vendors may provide websites or webpages for signing up for a credit card issued by the financial entity. Accordingly, variations of such websites may be provided to the various vendors with each variation including a different layout (e.g., background color, element alignment, text, etc.) as generated by the value generation engine 116.

During operation or use of the websites, various user interaction data from each of the variations of the website may be provided to the system 110 to determine the effectiveness of each layout. For example, the effectiveness of a layout for enticing a user to sign up for a credit card may be measured using binary success/failure data and timing data. As another example, the user data may include information related to a user purchasing a product or service, completing a survey, providing feedback, browsing new product information, accessing content, etc. Such information may be gathered to support and supplement a website variation process. As described, the variations of websites may be created using an automated process.

Figure 2:
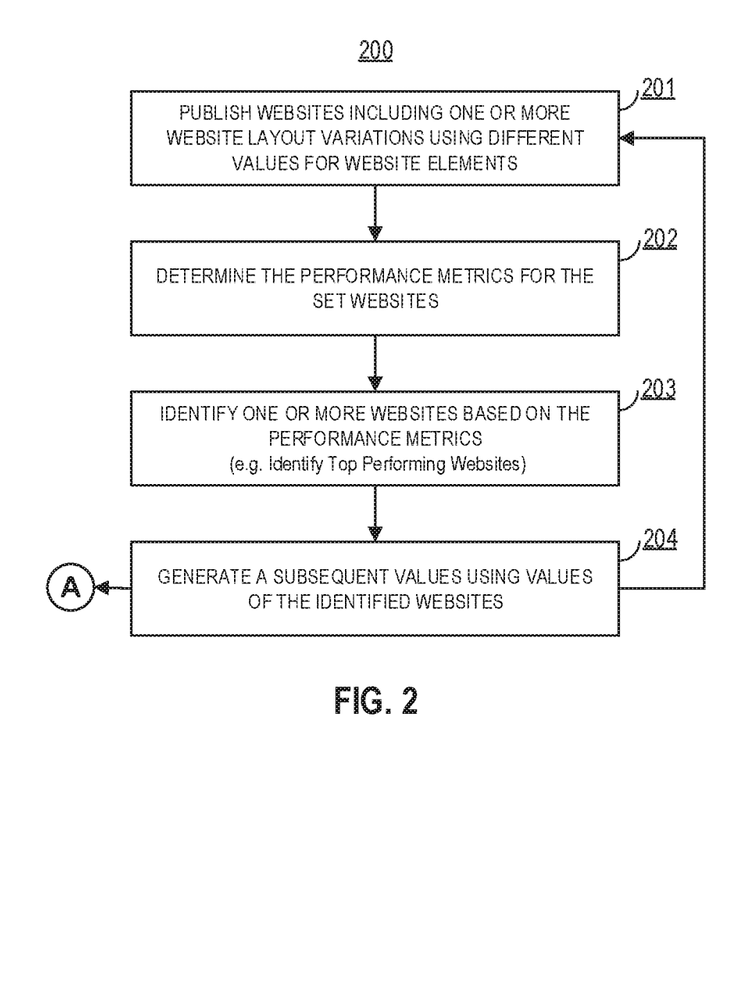
FIG. 2 is a process flow diagram illustrating an example of a process for automating the creation of website variations according to one or more implementations of the disclosure.

FIG. 2 is a process flow diagram illustrating an example of a process 200 for automating the creation of website variations according to one or more implementations of the disclosure. Process 200 may use processing logic, which may include software, hardware, or a combination thereof. For example, process 200 may be performed by a system including one or more components described in the operating environment 100 (e.g., website automation system 110).

In 201, a system (e.g. website automation system 110) implementing process 200 may publish (or identify, or provide) a set of websites including one or more variations of a website. For example, the set of websites may each provide a website with similar content and may each include a variation of a web site layout. In one implementation, each website layout may be varied by using different values for one or more elements of the website. For example, each website may provide similar content with for signing up for a credit card but may vary various values (e.g. values defining a color, alignment, etc.) associated with layout elements. As described previously, each website may include one or more elements, components, features, or functionality, (all of which may be generally referred to as elements) that describe, define, characterize, or are associated with a configuration or layout of the website, where the appearance and/or functionality of the layout depends on the values of the elements in the layout. In one implementation, the elements may include CSS elements that define (or describe) the layout of the website and the values may correspond to values for each element. For example, CSS elements may include a body element, header element, paragraph elements, etc., and the values for such elements may include a color value(s), an alignment value, a text value, a font size values, etc. It should be noted that such CSS elements are included as examples and any other type of webpage elements (e.g., HTML elements or other CSS elements) and corresponding values may be used to vary a website layout as described herein. In addition, other types of components, features, or functionality of a website may be varied. For example, various content (e.g., images, audio, video, etc.) may be varied amongst the set of websites. For example, values in such instances may include content filenames or links to the particular content.

In one implementation, the set of web sites may be provided initially by a developer. For example, a developer may create a new design for a website layout associated with a particular product or service. Accordingly, this new website layout may be included as part of an initial set of websites. Alternatively, or in addition to, the system may identify a particular set of already existing and published websites (e.g., live websites) that may be identified and included as part of the variation process. For example, an existing set of websites related to a product or service provided by a vendor may already exist and selected to be part of a process to improve user engagement.

In one implementation, the system may publish the websites to a subset of the public. For example, websites may be published to or for specific subsets of users that are defined based on demographic information, user account information, or any other criteria that may be useful for refining layouts to appeal to a particular group of users. As described, websites may be accessible to the general public (e.g., published), and thus, vast amounts of user interaction data may be collected. With such a large dataset, even minor improvements to the layout may result in considerable amount of improvement in the performance (e.g., increase in conversion rate, time efficiency, resource usage, favorability of the user experience, etc.) of a particular website. Accordingly, the system may measure such improvement with a performance metric(s).

In 202, the system may determine performance metric(s) for each website of the set of websites. For example, the system may evaluate the effectiveness (or performance) of each website by analyzing the performance metrics. The performance metrics may include various measures or data used to evaluate user engagement with a particular website. For example, the performance metric may be determined as part of a comparison with a predetermined goal, target, or desired value. In addition, the performance metric may be determined based a relative value based on a comparison between performance metrics of other websites. In one implementation, the performance metrics may include the amount of time it takes for a user to perform (or initiate or complete) an action or task. For example, the performance metric may represent, record, or measure the amount of time it takes a user to initiate a sign-up process, initiate a purchase of a product or a service, or complete an action such as a purchase, filling out a survey, reviewing a tutorial, etc. The performance metrics may also include a measurement or determination showing whether or not a user performs (or initiates, or completes) a particular action. For example, whether or not a user initiates an action as described above. One example of this type of performance metric is a measurement of a conversion rate for purchasing or signing up for a product or service. As another example, the performance metrics may include a determination representing whether or not a user selects various links or other interactive components of a website. As another example, the performance metrics may include data describing a navigation path or the number of clicks the user requires to perform an action or task.

In 203, the system may identify one or more websites based on the performance metrics. The system may perform a selection to propagate values of elements of the most effective website layouts. In one implementation, the system may identify the top performing websites based on their performance metrics. For example, the system may determine the highest ranking (or top performing) websites based on a number (e.g., 2, 5, 10, etc.), percentage (top 1%, 2%, or 5%, etc.), or any other suitable measure. For example, in the context of the performance metric including a time to perform a user action, the system may select the top 5 highest ranking websites which have the shortest time (e.g., median, mean, etc.) in which a user initiates a sign-up process for a product or service. As another example, the system may select the top 2% of websites which have the shortest time in which a user purchases a particular product or service. Using the values from the identified websites, the system may then generate (e.g., breed) websites.

In 204, the system may generate subsequent value(s) for a new generation of websites using values that are used in the identified websites. As described generally with a genetic algorithm, values from the identified websites (e.g. top performing website) may be determined and propagated to a new generation of websites. Accordingly, the subsequent generation of websites may select (e.g., combine, pass on, breed, propagate, etc.) values of the identified websites (e.g., top performers) as part of iterative improvement process. For example, each generation of websites has a theoretically improved layout by propagating the values which were determined to be effective (or the most effective).

In one implementation, the values may be selected at random from amongst the values of elements of the identified websites. However, as further described in FIG. 3, additional information and factors may be analyzed when generating subsequent values to be used for elements of a new generation of websites.

As shown, once a subsequent generation of websites is generated, the process may perform one or more additional iterations by returning to step 201, and repeating steps 201-204 until a completion condition is satisfied. For example, the iterations may complete once a predetermined number of iterations occur (e.g., a predetermined number of generations created), or a predetermined performance metric is achieved.

Figure 3:
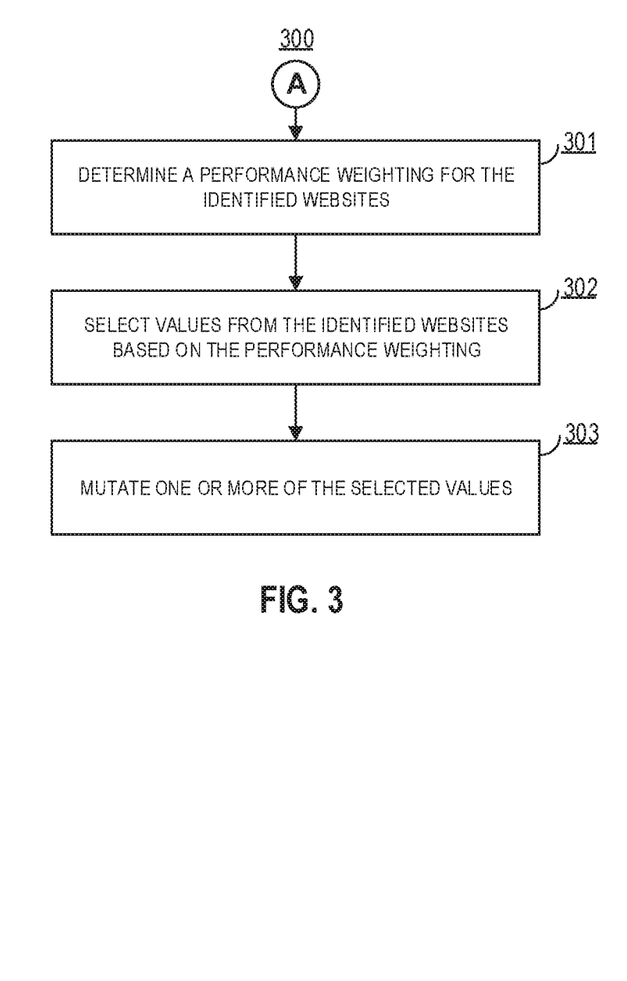
FIG. 3 is a process flow diagram illustrating an example of a process for generating subsequent values for a new generation of websites according to one or more implementations of the disclosure.

FIG. 3 is a process flow diagram illustrating an example of a process 300 for generating subsequent values for a new generation of websites according to one or more implementations of the disclosure. Process 300 may use processing logic, which may include software, hardware, or a combination thereof. For example, process 300 may be performed by a system including one or more components described in the operating environment 100 (e.g., web site automation system 110).

In 301, the system may determine a performance weighting for the selected websites. For example, the system may increase the probability (or rate) in which values are propagated based on the performance weighting. For example, the performance weighting may relate to the prevalence at which particular values (e.g., genes) are passed (or combined) to subsequent generations. In one implementation, the identified websites (e.g., top performers) may propagate (e.g., share, transfer, pass on, etc.) their values of elements to subsequent generations at different rates (or prevalence). For example, the identified websites may propagate their values (e.g., genes) at random, but the most effective (e.g., most successful performers based on a performance metric) may propagate their values at a higher rate than other websites from the identified group. For example, if website variation A has a 2 second conversion rate (e.g., a user performs an action in 2 seconds) and website variation B has a 3 second conversion rate, website variation A takes ⅔ the amount of time for a user to perform an action compared to website variation B. Accordingly, website variation A may have a performance weighting of ⅔ and website variation B may have a performance weighting of ⅓.

In 302, the system may select (or propagate) values from the identified websites based on the performance weighting. For instance, using the example above, website variation A may propagate its values (e.g., selected a subsequent values) to the new generation of websites ⅔ of the time while website variation B may propagate its values ⅓ of the time. As another example, website A may propagate ⅔ of its values as subsequent values while website variation B propagates ⅓ of its values. Accordingly, the system may select values from amongst the values of the identified websites using a probability based on the performance weighting.

In 303, the system may mutate one or more of the subsequent values. For example, as with the genetic analogy, genes often include mutations, and accordingly, the system may randomly reassign (e.g., switch, select, flip, etc.) one or more subsequent values based on a predetermined percentage (or mutation factor). For example, in one implementation, the system may randomly reassign a subsequent value less than 5% of the time. Other percentages such as 1% or 2%, or ranges (e.g., 1% to 2.5%) may also be used.

Figure 4:
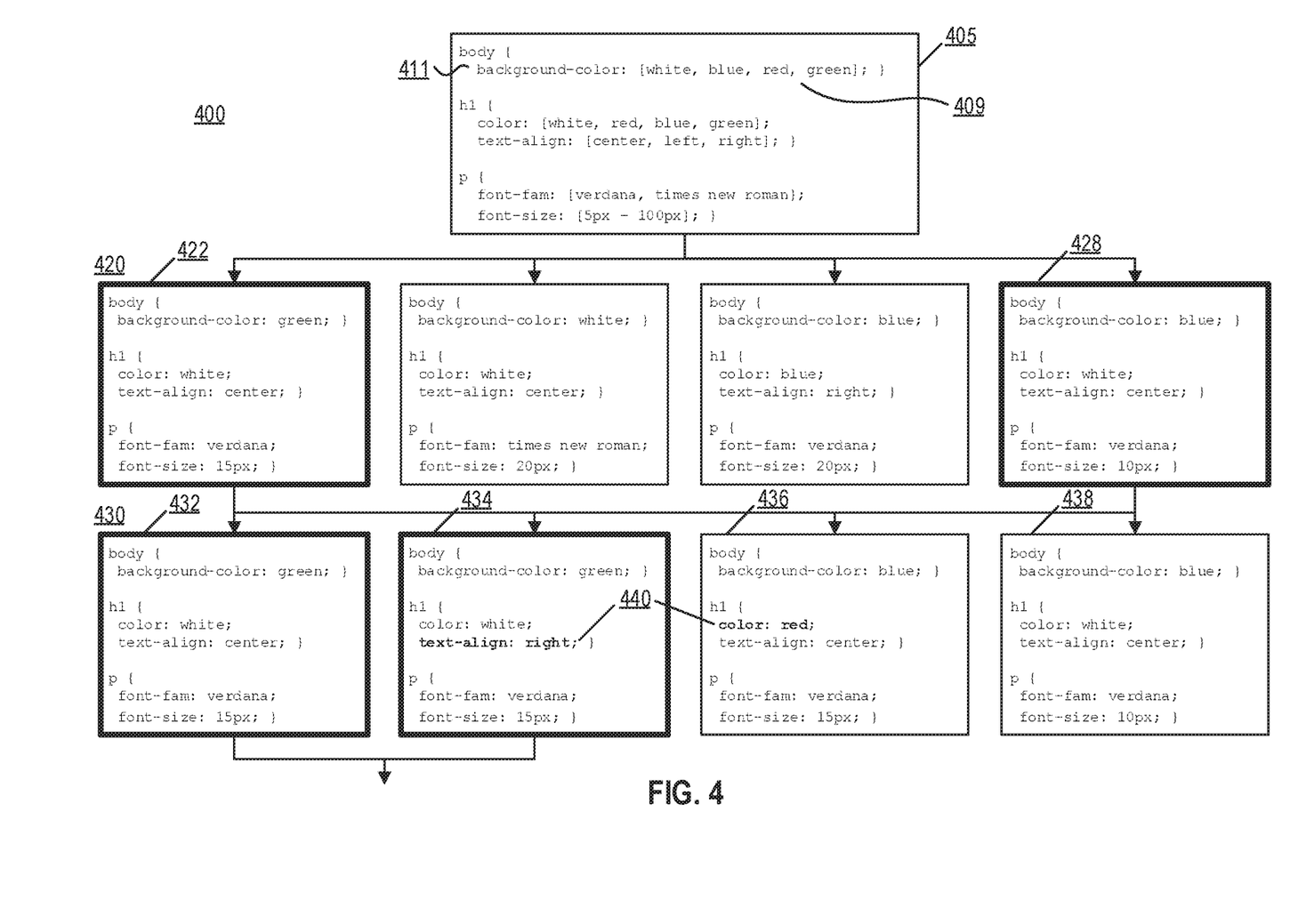
FIG. 4 is a diagram illustrating an example of generating a subsequent generation of websites with varying layouts according to one or more implementations of the disclosure.

FIG. 4 is a diagram illustrating an example of generating a subsequent generation of websites with varying layouts according to one or more implementations of the disclosure. As shown in diagram 400, a particular website 405, may include one or more elements (411-413), and a set of values 409 that may be selected for each element. As shown in this example, the elements may include CSS elements, which include a body 411, header 412, and paragraph 413 elements.

The initial set of websites 420 include the one or more elements, each element having a value. As described above, websites may be identified (or selected) based on a performance metric, and in this example, websites 422 and 428 are identified. For example, websites 422 and 428 may have been deemed the top performing websites. Accordingly, subsequent values may be generated for the subsequent generation of websites 430 from the values of websites 422 and 428 as shown. In one implementation, the values of website 422 and 428 may be passed on at random and/or based on a performance weighting as described above. As shown, websites 422 and 428 include "green" and "blue" values for the body element. Thus, the subsequent generation of websites 430 include either "green" or "blue" values for the body element. However, as described above, mutations may occur, and as shown, website 434 includes a mutation 440 for the text-align element being "right" and not "center," which is the value (e.g. gene) propagated by websites 422 and 428. Similarly, website 436 includes a mutation 440 for the heading color "red" and not "white," which is the value (e.g. gene) of websites 422 and 428. As a subsequent generation, websites 432 and 438 may be selected to generate another set of subsequent values to be propagated as part of another interaction of the process. Accordingly, the websites in this example provide an improvement for a layout with respect to CSS elements and values related to alignment, color, and text. However, as described above, such a process may be used for any other type of elements (or component, feature, functionality, etc.).

Figure 5:
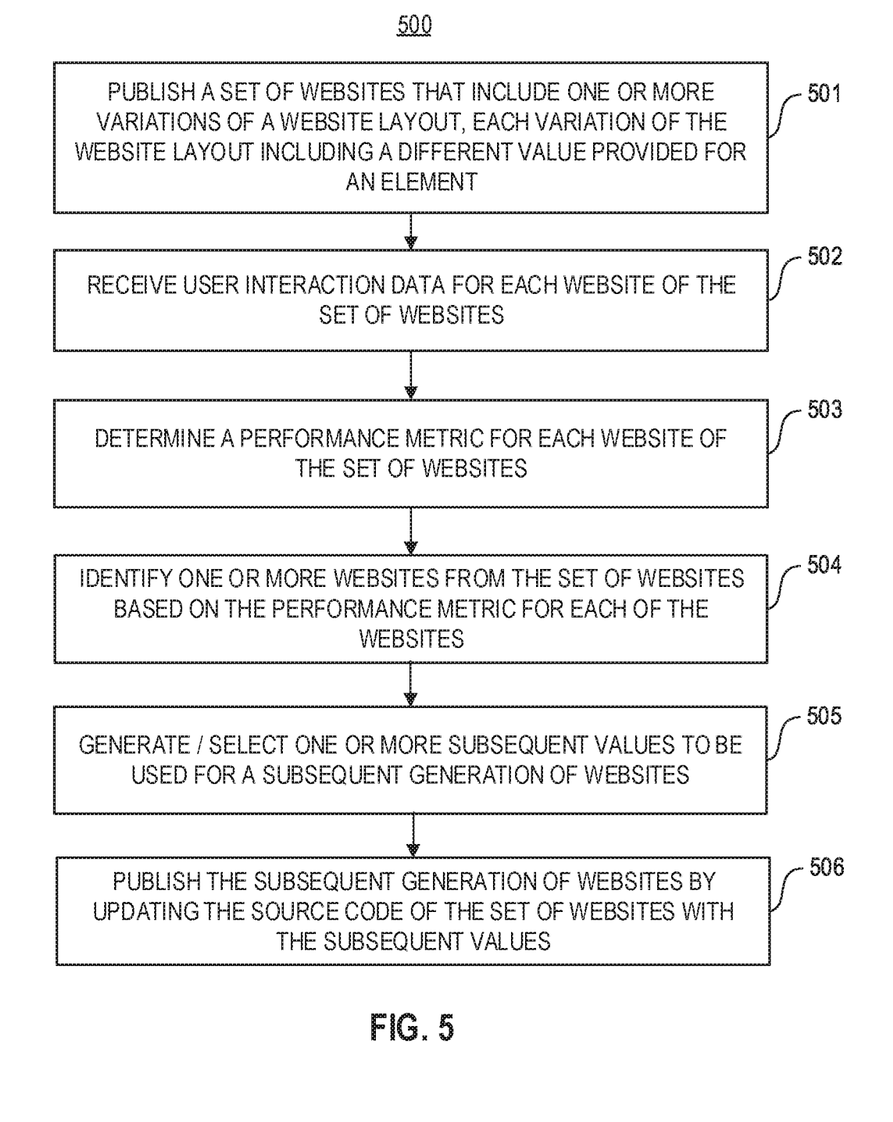
FIG. 5 is a flow diagram illustrating an example method of automating the creation of website variations according to one or more implementations of the disclosure.

FIG. 5 is a flow diagram illustrating an example method of automating the creation of website variations according to one or more implementations of the disclosure. Process 500 may use processing logic, which may include software, hardware, or a combination thereof. For example, process 500 may be performed by a system including one or more components described in operating environment 100 (e.g., website automation system 110).

In 501, the system may publish a set of websites. The set of websites may include an initial set of websites, or a new generation of websites as part of an interactive process as described. In one implementation, the published set of websites may include one or more variations of a website layout. For example, each variation of the website layout may include a different value provided for an element defined within source code of the set of websites. For example, the different values may be selected from an initial set of values. In one implementation, the one or more elements may include CSS (Cascading Style Sheet) elements and values may alter one or more properties for an element such as a color, alignment, text, text size, etc.

In 502, the system may receive user interaction data for each website of the set of websites. The user interaction data may be collected by each website, or a manager that monitors user interaction with each website. This information may then be provided, for example, as a data file to the system. The system may parse the file and analyze the information to determine or collect performance metrics. The user interaction data may be pre-processed or may contain raw data that is analyzed by the system. For example, pre-processed data may include a binary value (e.g., true/false) of whether a user performed a particular action (e.g. sign-up or purchase), or an amount of time (e.g. number of seconds) that a user required to perform or initiate a particular action. Raw data may include a user interaction history (e.g. a log of actions performed, and time data), which may then be processed by the system to determine various performance metrics such as whether a particular action was performed by tracing the user interaction history or calculating an amount of time required to perform or initiate an action from the time data.

In 503, the system may determine a performance metric for each website of the set of websites. The performance metric may reflect (or measure) one or more user interactions with each website. For example, the system may determine such performance metrics by analyzing user interaction data as described in 502. For example, the performance metrics may include a measurement of the amount of time it takes a user to initiate or complete an action (or task) such as a sign-up process, a purchase of a product or a service, filling out a survey, reviewing or accessing a tutorial, etc. As another example, the performance metrics may also include a determination of whether or not a user performs (or initiates, or completes) a particular action those described above.

In 504, the system may identify one or more websites from the set of websites based on the performance metric for each of the websites. The identified websites may correspond to the population (e.g., websites) that are deemed the fittest (e.g., top performers for user engagement) from which chromosomes/genes (e.g., values) are passed down to subsequent generations. For example, the system may identify the websites/layouts that are most effective for user engagement, which may be measured based on the determined performance metrics.

In one implementation, the performance metrics of each website may be compared to other websites to determine the best-performing websites. In one implementation, the system may rank (or order, or tier) the set of websites based on the determined performance metric. For example, when the performance metric relates to an amount of time for a user to perform an action on each website, the system may rank the set of websites based on the determined performance metric may include ranking each web site from a least amount of time for the user to perform the action to a greatest amount of time for the user to perform the action. Accordingly, identifying one or more web sites from the set of web sites may include identifying one or more highest ranking websites within a predetermined number of highest ranking websites (e.g., top 10 websites) or a predetermined percentage of highest ranking websites (e.g., top 10% of websites). As another example, the system may identify one or more websites in which the user performs the particular action.

In 505, the system may generate one or more subsequent values to be used for a subsequent generation of websites. In one implementation, generating the subsequent values may include selecting the subsequent values from amongst the values provided for the element of the identified websites. To determine the values provided for one or more elements, the system may parse the source code of the identified websites. For example, the system may select values from amongst the values (e.g., color, text, alignment, text size, etc.) used in the highest ranking or top performing websites. For instance, the system may determine the various values defining the color of a header element of the highest ranking websites. These colors may then be propagated to the new generation of websites.

The system may also include random mutations. For example, in one implementation, selecting the subsequent values may include randomly selecting values from amongst the values provided for the element of the identified websites. For example, the probability (or likelihood) that a particular value is propagated to the next generation of websites may be equal (or an equal distribution). In some implementations, however, various other factors may alter the probability that a particular value is propagated to the new generation of websites. In one implementation, the system may determine a performance weighting for each identified website based on a ranking of the performance metric of each identified website. In addition, the system may mutate one or more subsequent values. For example, the system may reassign, based on a predetermined percentage (e.g., mutation rate), one or more of the subsequent values with a random value selected from amongst the initial set of values.

In 506, the system may publish the subsequent generation of websites by updating the source code of the set of websites with the subsequent values. For example, a website manager may update the source code of the published set of websites with the subsequent values. The system may update such websites as a batch or may update websites individually. As described, such a process may be repeated. Accordingly, the system may perform one or more further iterations of the website variation process for one or more subsequent generation of websites.

In addition, the system may track differences between the generations of websites to aid in additional processes. In one implementation, the system may map the values of each generation of websites for a more efficient website testing process. For example, the system map changes between the initial set of values and the subsequent values for a testing configuration file as shown, for example, in FIG. 6.

Figure 6:
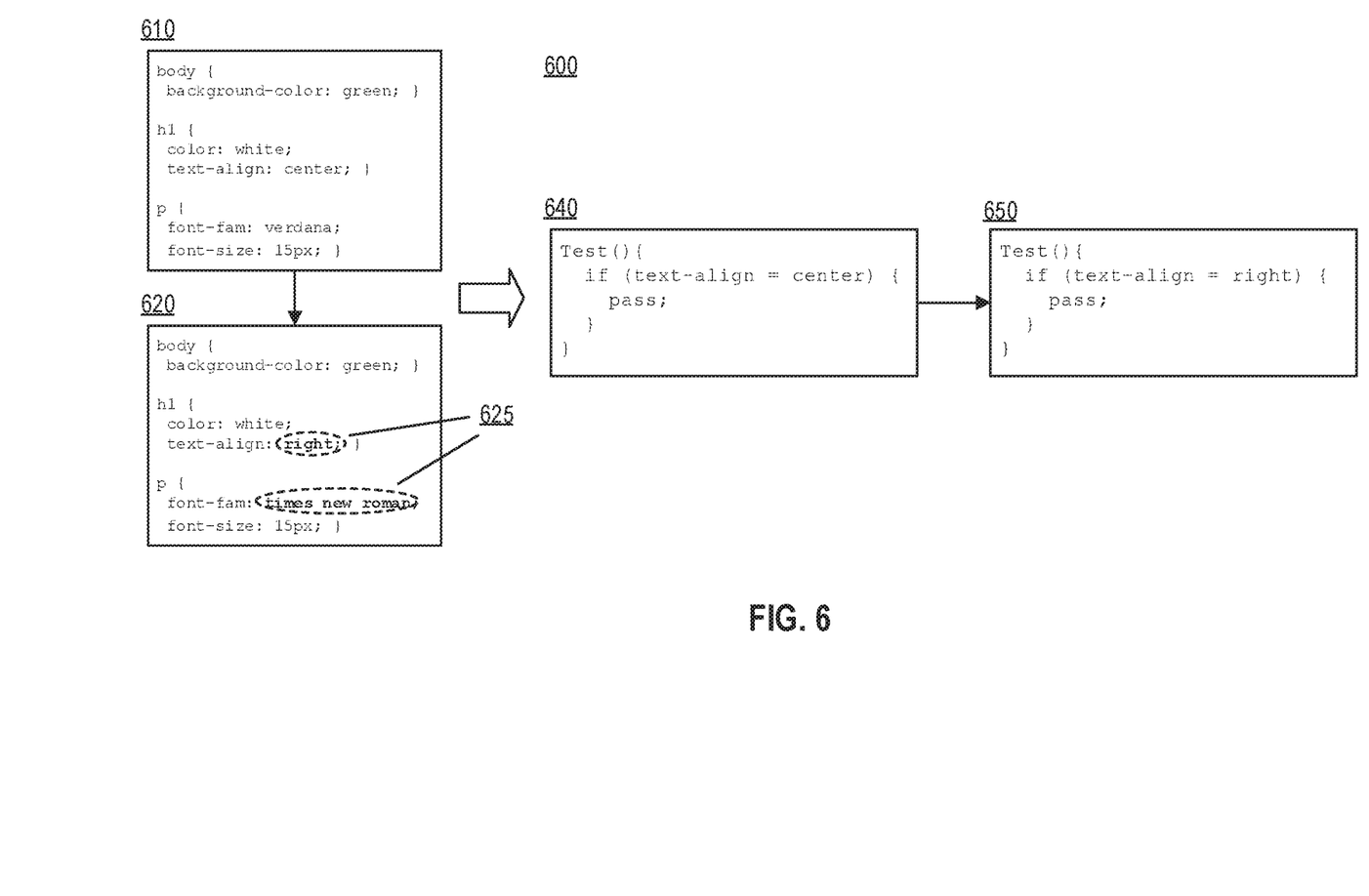
FIG. 6 is a diagram illustrating an example of mapping the changes between values of subsequent generations of websites according to one or more implementations of the disclosure.

FIG. 6 is a diagram illustrating an example of mapping the changes between values of subsequent generations of websites according to one or more implementations of the disclosure. As shown in diagram 600, the system may map changes between a website from an initial generation 610 and a website of a subsequent generation 620. As shown, values 625 that have been altered may be represented in corresponding testing configuration scripts 640 and 650. Such a map may be saved to a configuration file, which may be used for testing purposes. For example, by mapping the changes, the system may update a testing database and appropriately test each variation implemented by the variation process as described above. For example, as shown in this example, the heading text-alignment element has been varied (e.g., modified) from "center" to "right." Accordingly, as shown, the system may automatically map the changes to test script 650 to indicate that a particular element has changed from a text-align center to text-align right. In addition, the system may track changes using a hash value to create a record of traceable changes. Accordingly, developers need not manually track variations of each generation. Accordingly, the system may automatically track the changes for each website generation.

Accordingly, some implementations described above, provides a mechanism for automating the process of generating variations of a web site that may be continually evaluated and refined to improve user engagement.

One of ordinary skill will recognize that the components, processes, data, operations, and implementation details shown in FIGS. 1-6 are examples presented for conciseness and clarity of explanation. Other components, processes, implementation details, and variations may be used without departing from the principles of the disclosure, and these example are not intended to be limiting as many variations are possible. For example, the operations (or methods, processes, etc.) shown and described above are not necessarily performed in the order indicated and may be performed in parallel. It should also be understood that the methods may include more or fewer operations than are indicated. In some implementations, operations described herein as separate operations may be combined. Conversely, what may be described herein as a single operation may be implemented in multiple operations.

Figure 7:
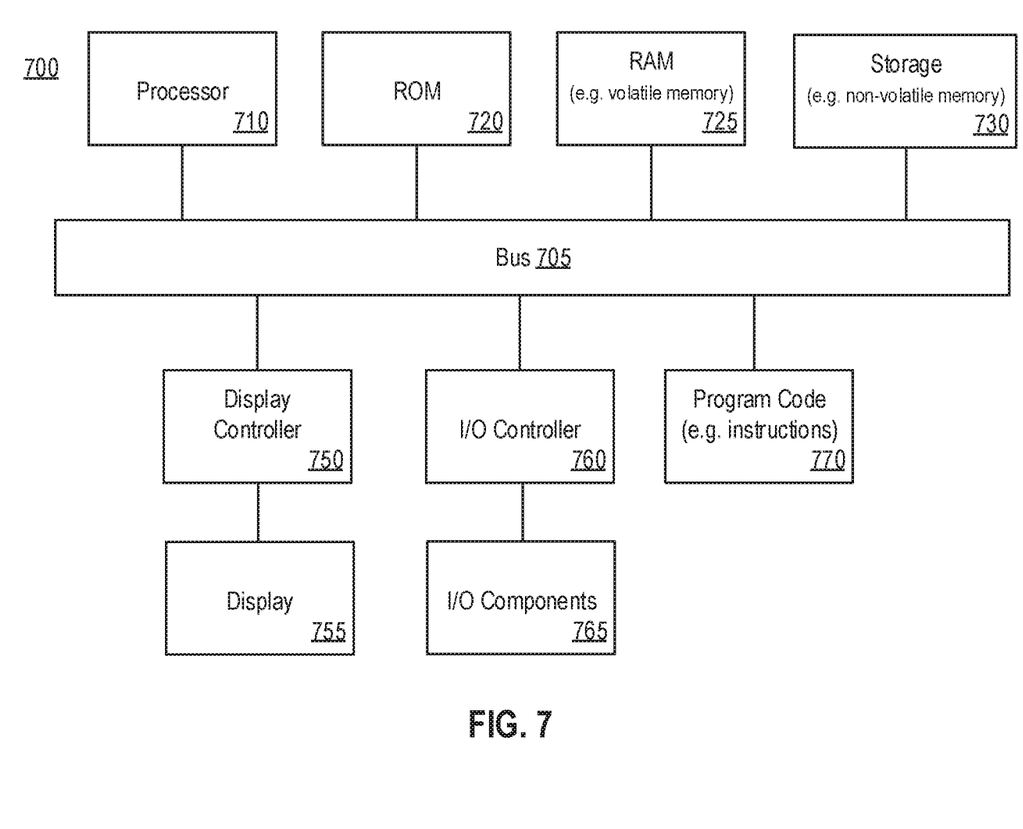
FIG. 7 is a block diagram illustrating an example of a computing system that may be used in conjunction with one or more implementations of the disclosure.

FIG. 7 shows a block diagram of an example of a computing system that may be used in conjunction with one or more implementations. For example, computing system 700 (or system, or server, or computing device, or device) may represent any of the devices or systems (e.g., website automation system 110) described herein that perform any of the processes, operations, or methods of the disclosure. Note that while the computing system 500 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 700 may include a bus 705 which may be coupled to a processor 710, ROM (Read Only Memory) 720, RAM (or volatile memory) 725, and storage (or non-volatile memory) 730. The processor 710 may retrieve stored instructions from one or more of the memories 720, 725, and 730 and execute the instructions to perform processes, operations, or methods described herein. These memories represent examples of a non-transitory computer-readable medium (or machine-readable medium, or storage) containing instructions which when executed by a processor (or system, or computing system), cause the processor to perform operations, processes, or methods described herein. The RAM 725 may be implemented as, for example, dynamic RAM (DRAM), or other types of memory that require power continually in order to refresh or maintain the data in the memory. Storage 730 may include, for example, magnetic, semiconductor, tape, optical, removable, non-removable, and other types of storage that maintain data even after power is removed from the system. It should be appreciated that storage 730 may be remote from the system (e.g., accessible via a network).

A display controller 750 may be coupled to the bus 705 in order to receive display data to be displayed on a display device 755, which can display any one of the user interface features or embodiments described herein and may be a local or a remote display device. The computing system 700 may also include one or more input/output (I/O) components 765 including mice, keyboards, touch screen, network interfaces, printers, speakers, and other devices. Typically, the input/output components 765 are coupled to the system through an input/output controller 760.

Program code 770 (or modules, instructions, components, subsystems, units, functions, or logic) may represent any of the instructions, operations, subsystems, or engines described above. Program code 770 may reside, completely or at least partially, within the memories described above (e.g., non-transitory computer-readable media), or within a processor during execution thereof by the computing system. In addition, program code 770 can be implemented as software, firmware, or functional circuitry within the computing system, or as combinations thereof.

Moreover, any of the disclosed implementations may be embodied in various types of hardware, software, firmware, and combinations thereof. For example, some techniques disclosed herein may be implemented, at least in part, by non-transitory computer-readable media that include program instructions, state information, etc., for performing various methods and operations described herein. Examples of program instructions include both machine code, such as produced by a compiler, and files containing higher-level or intermediate code that may be executed by a computing device such as a server or other data processing apparatus (or machine) using an interpreter.

It should be noted that the term "approximately" or "substantially" may be used herein and may be interpreted as "as nearly as practicable," "within technical limitations," and the like. In addition, the use of the term "or" indicates an inclusive or (e.g., and/or) unless otherwise specified.

Other implementations of the invention will be apparent to those skilled in the art from consideration of the specification and practice of the invention disclosed herein. It is intended that the specification and examples be considered as examples only, with a true scope and spirit of the invention being indicated by the claims.

The invention claimed is:

1. A method for automatically generating variations of a website, the method comprising:
   determining a performance metric for each website of a set of websites, the performance metric reflecting one or more user interactions with each website;
      wherein set of websites that include one or more variations of a website layout, each variation of the website layout including a different value provided for an element defined within source code of the set of websites, the different values selected from an initial set of values;
      wherein the performance metric includes an amount of time for a user to perform an action on the website;
   ranking websites based on the performance metrics for the set of websites;
      wherein ranking websites based on the performance metrics includes ranking each website from a least amount of time for the user to perform the action to a greatest amount of time for the user to perform the action;
   identifying one or more websites from the set of websites satisfying a threshold performance metric;
      wherein identifying one or more websites from the set of websites based on the determined performance metric includes identifying one or more highest ranking websites within a predetermined number of highest ranking websites or a predetermined percentage of highest ranking websites; and
   publishing a subsequent generation of websites by updating the source code of the set of websites with one or more subsequent values selected from the one or more websites.

2. The method of claim 1, wherein selecting the subsequent values includes randomly selecting values from amongst the values provided for the element of the identified web sites.

3. The method of claim 1, wherein the element includes a CSS (Cascading Style Sheet) element.

4. The method of claim 3, wherein the values provided for the element define a color, alignment, text, or text size associated with the element.

5. The method of claim 1, wherein
the performance metric includes whether a user performs a particular action on the website, and
identifying one or more websites from the set of websites based on the determined performance metric includes identifying one or more websites in which the user performs the particular action.

6. The method of claim 1, further comprising publishing each website of the set of websites to a subset of users based at least in part on user demographics, user account information, or both.

7. The method of claim 1, wherein the action comprises one or more interactions with respective one or more elements of each the one or more variations of the website layout.

8. The method of claim 1, further comprising updating the source code of the set of web sites with one or more subsequent values selected from each respective set of one or more web sites;
wherein each respective set of one or more websites from the set of websites are identified for each of a respective threshold performance metric.

9. The method of claim 1, wherein generating the subsequent values further includes:
reassigning, based on a predetermined percentage, one or more of the subsequent values with a random value selected from amongst the initial set of values.

10. The method of claim 1, further comprising:
determining a performance weighting for each identified website based on a ranking of the performance metric of each identified website; and
wherein selecting the subsequent values includes selecting values from amongst the values provided for the element of the identified websites using a probability based on the performance weighting.

11. The method of claim 1, further comprising:
receiving user interaction data for each website of the set of websites; and
parsing the source code of the identified websites to determine the values provided for the element of the identified websites.

12. The method of claim 1, wherein the steps of determining, identifying, generating, and publishing the subsequent generation of websites are repeated one or more times for each subsequent generation of websites.

13. The method of claim 1, further comprising mapping changes between the initial set of values and the subsequent values for a testing configuration file.

14. A system for automatically generating variations of a website, comprising:
one or more processors; and
a memory coupled to the one or more processors, the memory storing instructions, which when executed by the one or more processors, cause the one or more processors to perform operations comprising:
determining a performance metric for each website of the set of websites;
wherein set of websites that include one or more variations of a website layout, each variation of the website layout including a different value provided for an element defined within source code of the set of websites, the different values selected from an initial set of values;
wherein determining the performance metric for each website of the set of websites includes measuring an amount of time for a user to perform an action on the website;
ranking the set of websites based on the determined performance metric;
wherein ranking the set of websites based on the determined performance metric includes ranking each website from a least amount of time for the user to perform the action to a greatest amount of time for the user to perform the action;
identifying one or more websites satisfying a threshold performance metric; and
publishing a subsequent generation of websites by updating the source code of the set of websites with one or more subsequent values selected from the one or more web sites.

15. The system of claim 14, further comprising publishing each website of the set of websites to a subset of users based at least in part on user demographics, user account information, or both.

16. The system of claim 14, wherein selecting the subsequent values includes randomly selecting values from amongst the values provided for the element of the identified web sites.

17. A non-transitory computer-readable medium storing instructions which, when executed by one or more processors of a system, cause the system to perform operations comprising:
determining a performance metric for each website of a set of websites, the performance metric reflecting one or more user interactions with the website;
wherein set of websites that include one or more variations of a website layout, each variation of the website layout including a different value provided for an element defined within source code of the set of websites, the different values selected from an initial set of values;
wherein the performance metric includes an amount of time for a user to perform an action on each website;
identifying one or more websites from the set of websites satisfying a threshold performance metric;
wherein identifying one or more websites from the set of websites includes:
i) ranking each website of the set of websites from a least amount of time for the user to perform the action to a greatest amount of time for the user to perform the action; and
ii) identifying one or more highest ranking websites within a predetermined number of highest ranking websites or a predetermined percentage of highest ranking websites; and
publishing a subsequent generation of websites by updating the source code of the set of websites with one or more subsequent values selected from the one or more websites.

18. The non-transitory computer-readable medium of claim 17, wherein the values provided for the element define a color, alignment, text, or text size associated with the element.

19. The non-transitory computer-readable medium of claim 17, further comprising publishing each web site of the set of web sites to a subset of users based at least in part on user demographics, user account information, or both.

20. The non-transitory computer-readable medium of claim 17, wherein randomly selecting the subsequent values further includes:

reassigning, based on a predetermined percentage, one or more of the subsequent values with a random value selected from amongst the initial set of values.

\* \* \* \* \*